(12) United States Patent
McGhie et al.

(10) Patent No.: US 11,305,137 B1
(45) Date of Patent: Apr. 19, 2022

(54) ADJUSTABLE MOUTH SHIELD DEVICE

(71) Applicant: Eric McGhie, Charlotte, NC (US)

(72) Inventors: Eric McGhie, Mint Hill, NC (US); Darrell Harvey, Mint Hill, NC (US)

( * ) Notice: Subject to any disclaimer, the term of this patent is extended or adjusted under 35 U.S.C. 154(b) by 459 days.

(21) Appl. No.: 14/701,279

(22) Filed: Apr. 30, 2015

Related U.S. Application Data

(63) Continuation-in-part of application No. 13/021,547, filed on Feb. 4, 2011, now Pat. No. 8,434,493, and a
(Continued)

(51) Int. Cl.
| | |
|---|---|
| A62B 23/02 | (2006.01) |
| A41D 13/11 | (2006.01) |
| H04R 1/08 | (2006.01) |
| H04M 1/05 | (2006.01) |
| A62B 18/02 | (2006.01) |

(Continued)

(52) U.S. Cl.
CPC ............ *A62B 23/025* (2013.01); *A41D 13/11* (2013.01); *A41D 13/1107* (2013.01); *A41D 13/1138* (2013.01); *A41D 13/1169* (2013.01); *A41D 13/1192* (2013.01); *A62B 18/02* (2013.01); *A62B 18/084* (2013.01); *A62B 23/02* (2013.01); *H04M 1/05* (2013.01); *H04R 1/08* (2013.01); *H04R 1/083* (2013.01); *H04R 1/086* (2013.01); *A41D 31/30* (2019.02)

(58) Field of Classification Search
CPC ... A62B 18/0003; A62B 18/02; A62B 18/025; A62B 18/04; A62B 18/08; A62B 18/084; A62B 23/025; A62B 23/00; A41D 2400/34; A41D 13/11; A41D 13/1107; A41D 13/1123; A41D 13/1138; A41D 13/1161; A41D 13/1169; A41D 13/1192; A41D 31/30; A61F 11/12; A61F 11/14; A61M 16/06; A61M 16/0683; A61M 2210/0625; H04R 1/08; H04R 1/086; H04R 1/083; H04M 1/05; H04M 1/6058
USPC ............ 128/200.28, 201.14, 201.19, 201.22, 128/201.23, 205.25, 202.29, 206.12, 857, 128/863, 866; 381/355, 359, 374–376; 704/272

See application file for complete search history.

(56) References Cited

U.S. PATENT DOCUMENTS

| | | | | |
|---|---|---|---|---|
| 2,295,119 | A | * | 9/1942 | Malcom ................. A62B 18/00 128/206.17 |
| 3,056,402 | A | * | 10/1962 | Dickinson ............ A62B 18/084 128/206.27 |

(Continued)

*Primary Examiner* — Keri J Nelson
(74) *Attorney, Agent, or Firm* — Invention To Patent Services; Alex Hobson

(57) ABSTRACT

An adjustable mouth shield device provides an adjustably fitted mouth shield with adjustable headband for secure fit. An adjustable headband is fastened to a padded earpiece. A straight first extension from the earpiece is angled downwardly and forwardly to terminate in a swivel joint providing almost 360 degrees of swivel. A second extension is arced both downwardly and forwardly. A mouthpiece is fitted to an adjustable spring mount for horizontal pivot of the mouthpiece. The mouthpiece may, by virtue of the swivel joint and the spring mount, be moved completely away from a user's mouth and, in turn, pivoted and swiveled to be directly in front of the user's mouth. A filter is releasably attachable to the mouthpiece to shield a user's breath from objects, foods and other materials.

5 Claims, 5 Drawing Sheets

Related U.S. Application Data continuation-in-part of application No. 13/685,424, filed on Nov. 26, 2012, now abandoned.

(51) Int. Cl.
*A62B 18/08* (2006.01)
*A41D 31/30* (2019.01)

(56) References Cited

U.S. PATENT DOCUMENTS

| | | | | |
|---|---|---|---|---|
| 5,381,486 A * | 1/1995 | Ludeke | ............... | H04R 1/08 16/367 |
| D449,883 S | 10/2001 | McDonald et al. | | |
| 6,595,207 B1 * | 7/2003 | McDonald | ............ | A61M 16/06 128/200.24 |
| 6,619,288 B2 * | 9/2003 | Demers | ............... | A61M 16/06 128/205.25 |
| 8,434,493 B1 * | 5/2013 | McGhie | ............... | H04R 1/1066 128/200.24 |
| 8,733,356 B1 * | 5/2014 | Roth | ............... | A62B 18/08 128/205.27 |
| 2003/0057012 A1 * | 3/2003 | Owens | ............... | H04R 1/086 181/205 |
| 2008/0089546 A1 * | 4/2008 | Ward | ............... | H04R 1/083 381/376 |
| 2008/0304690 A1 * | 12/2008 | Poindexter | ............... | H04R 1/08 381/375 |
| 2010/0185432 A1 * | 7/2010 | Almagro | ............... | H04R 5/033 704/2 |
| 2010/0269832 A1 * | 10/2010 | Lin | ............... | A62B 18/025 128/206.19 |
| 2012/0095768 A1 * | 4/2012 | McClung, III | ............... | H04R 1/083 704/272 |
| 2012/0247474 A1 * | 10/2012 | Torbenson | ............... | A62B 18/02 128/206.15 |
| 2015/0373447 A1 * | 12/2015 | Ball | ............... | H04R 1/086 381/359 |
| 2018/0078798 A1 * | 3/2018 | Fabian | ............... | A62B 7/10 |

* cited by examiner

ADJUSTABLE MOUTH SHIELD DEVICE

TO ALL WHOM IT MAY CONCERN

Be it known that we, Eric McGhie and Darrell Harvey, citizens of the United States, have invented new and useful improvements in an adjustable mouth shield as described in this specification. This application is a continuation-in-part and claims benefit of our U.S. patent application Ser. No. 13/021,547 filed on Feb. 4, 2011 and U.S. patent application Ser. No. 13/685,424 filed on Nov. 26, 2012.

CROSS-REFERENCE TO RELATED APPLICATIONS

U.S. patent application Ser. No. 13/021,547 Filed Feb. 4, 2011
U.S. patent application Ser. No. 13/685,424 Filed Nov. 26, 2012

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Many professions call for an individual's breath to be shielded from work objects, other personnel, work surfaces, and the like. This may be especially true in food preparation, food service industries, and medical professions. The present device provides unique advantages in the art.

FIELD OF THE INVENTION

The adjustable mouth shield device relates to mouth guards and more especially to a mouth shield device with adjustable headband, an earpiece, and a mouthpiece with disposable filter moveably affixed to the earpiece via extensions with a spring mount and a swivel joint.

SUMMARY OF THE INVENTION

The general purpose of the adjustable mouth shield device, described subsequently in greater detail, is to provide an adjustable mouth shield device which has many novel features that result in an improved adjustable mouth shield device which is not anticipated, rendered obvious, suggested, or even implied by prior art, either alone or in combination thereof.

To attain this, the adjustable mouth shield device provides an adjustably fitted mouth shield with adjustable headband for secure fit. The adjustable headband is fastened to the earpiece that may include a curvature of 180 degrees and more and may also include a replaceable pad. The earpiece may have a straight first extension angled downwardly and forwardly to terminate in a swivel joint. The swivel joint may provide almost 360 degrees of swivel. A more basic embodiment of the device may exclude the swivel joint. The second extension may be arced, both downwardly and forwardly.

The mouthpiece fitted to the second extension may be fitted directly or may be fitted by a spring mount that allows horizontal pivot of the mouthpiece. The spring mount may be provided with an adjustment that may be relaxed to provide movable mouthpiece placement or may be adjusted to provide that the mouthpiece returns to a position in front of a user's mouth.

The mouthpiece may, by virtue of the swivel joint and the spring mount, be moved completely away from a user's mouth and, in turn, pivoted and swiveled to be directly in front of the user's mouth. The mouthpiece may include an arcuate, perforated, generally rectangular plate with a border disposed around an interior surface. The border may include a plurality of crenellate members disposed to contact and releasably secure an interchangeable filter slidingly installed into the mouthpiece. The filter may include antimicrobial, bactericidal and fungicidal properties and may also be scented to treat exhalations from the person wearing the device.

The mouthpiece may include a cover having a front surface and a rear surface. The rear surface of the mouthpiece cover releasably attaches to enclose the filter when releasably installed to the mouthpiece. The front surface of the mouthpiece cover may include a pocket that is configured to allow a user to store medication, such as pills. At least one adhesive strip may be disposed on the front surface of the mouthpiece cover so that an interchangeable perforated covering may be removably attached to the at least one adhesive strip. A perimeter of the covering substantially conforms to a perimeter of the mouthpiece cover. The covering is bactericidal and fungicidal. The front surface of the mouthpiece cover may also include a logo or brand name disposed to display a desired brand to people interacting with the wearer of the device.

A microphone may also be integrated into the device, whereby the device includes telephonic, Wi-Fi, and Bluetooth capabilities, useful, for example, for use in restaurants that operate a drive-through window or around the operating table where communication is vital between professionals working in the most sterile of environments. The device may also include a Wi-Fi activation control. The Wi-Fi activation control is configured to turn on and alternately to turn off the device's Wi-Fi capabilities.

Although the device is useful in many pursuits, it is especially useful in the food industry in order to confine the spread of germs from a user to the various food items that are being prepared. The device thus displays a restaurant's concern for customer safety, well-being, and satisfaction. Adjustability ensures that the device may fit any user. The device is made of lightweight materials and is easily applied and removed. The device may also be desirable in the medical professions where a sterile environment is strictly enforced, and where the lightweight, portable character of the device—as well as the interchangeable filter that treats each exhalation from the user—may be desirous and appreciated.

Thus has been broadly outlined the more important features of the improved adjustable mouth shield device so that the detailed description thereof that follows may be better understood and in order that the present contribution to the art may be better appreciated.

An object of the adjustable mouth shield device is to shield a user's breath from a given area, object, person, or foodstuff.

Another object of the adjustable mouth shield device is to adjustably fit a user's head.

A further object of the adjustable mouth shield device is to provide a padded earpiece for further secure fit.

An added object of the adjustable mouth shield device is to provide a mouthpiece with removable, disposable pads.

And, an object of the adjustable mouth shield device is to provide a spring mount for the mouthpiece.

Still another object of the adjustable mouth shield device is to provide for selectively pivoting the mouthpiece away from and in front of a user's mouth.

These, together with additional objects, features and advantages of the improved adjustable mouth shield device will be readily apparent to those of ordinary skill in the art upon reading the following detailed description of presently preferred, but nonetheless illustrative, embodiments of the improved adjustable mouth shield device when taken in conjunction with the accompanying drawings.

BRIEF DESCRIPTION OF THE DRAWINGS

Figures

DETAILED DESCRIPTION OF THE DRAWINGS

With reference now to the drawings, and in particular FIGS. 1 through 6 thereof, 19 the principles and concepts of the adjustable mouth shield device generally designated 20 by the reference number 10 will be described. The adjustable mouth shield device may also be described as an adjustable cup or mask or adjustable mouth covering device which may be used interchangeably throughout the specification.

Figure 1:
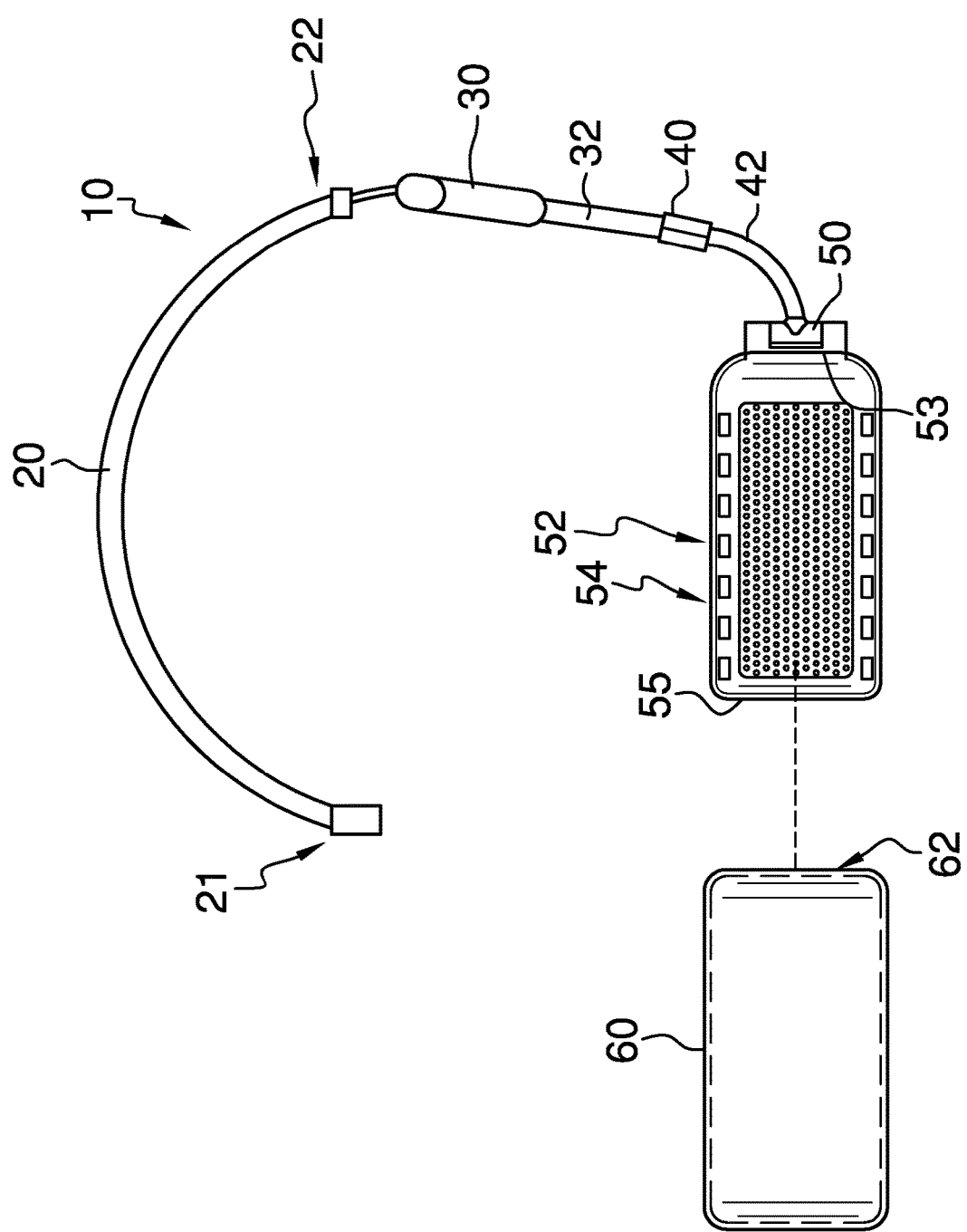
FIG. 1 is a front view.

Referring to FIG. 1, the device 10 partially comprises the adjustable headband 20 having a first side 21 spaced apart from the second side 22.

Figure 5:
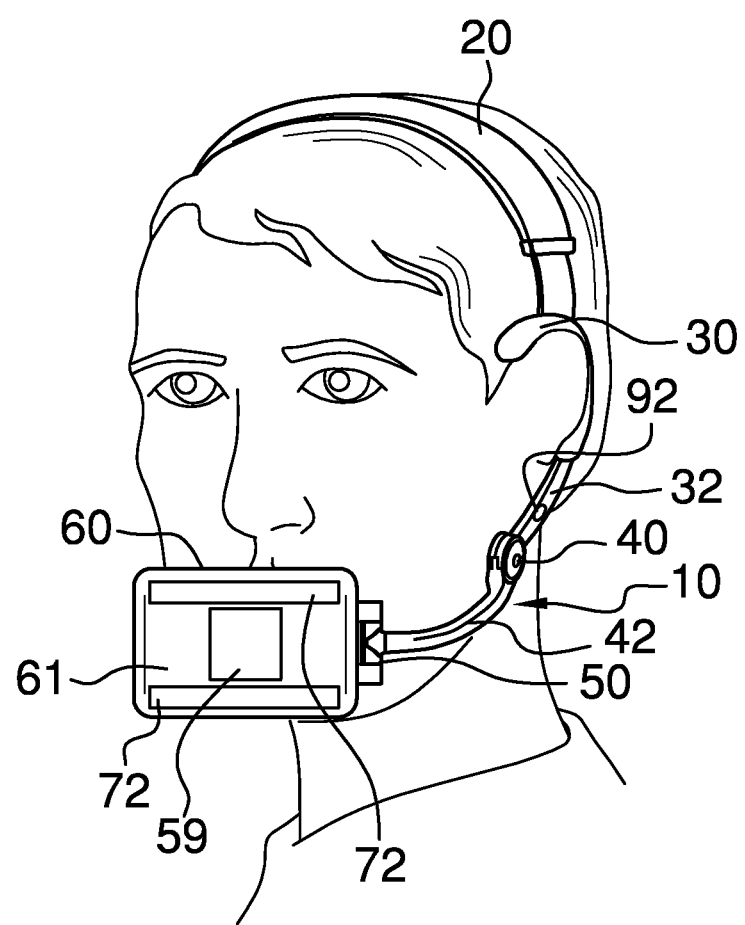
FIG. 5 is an in-use view.

Referring to FIG. 5, the adjustable headband 20 is removably fitted atop a user's head.

Figure 3:
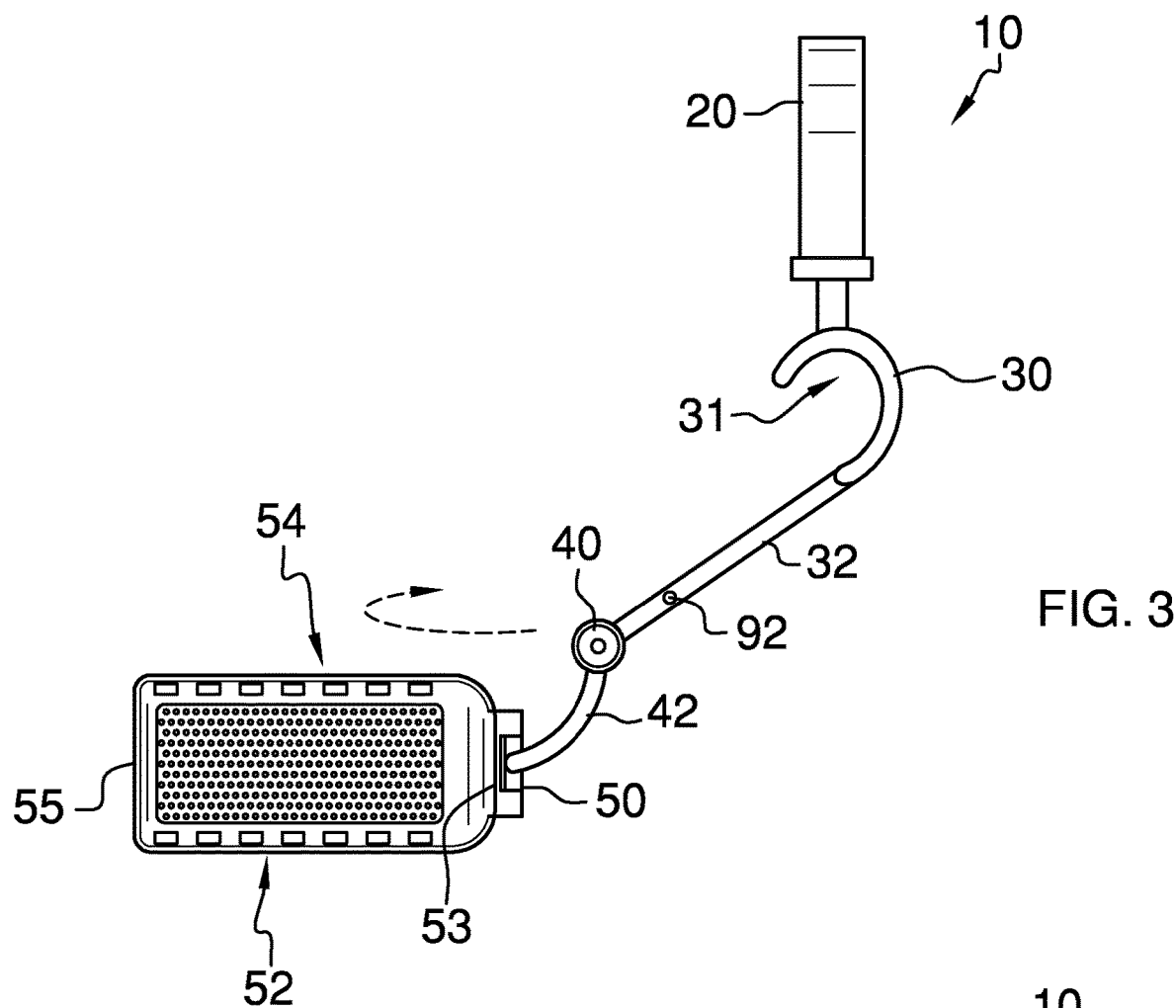
FIG. 3 is a side view with a mouthpiece pivoted outward.
Figure 4:
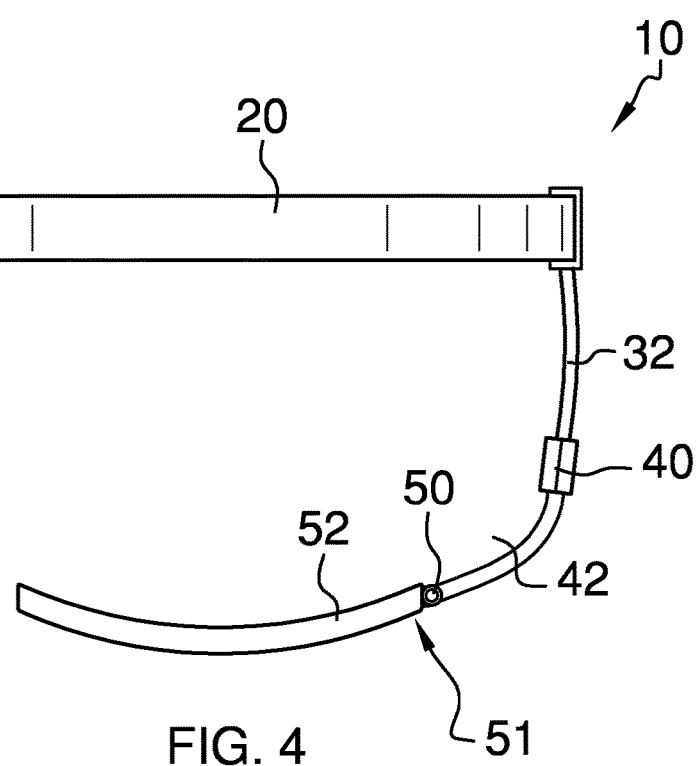
FIG. 4 is a top view.

Referring to FIG. 3, the padded earpiece 30 is affixed downwardly to the adjustable headband 20 second side 22. The earpiece 30 may optionally have at least a 180 degree curvature 31. The first extension 32 is extended straight, forwardly and downwardly from the earpiece 30.

Figure 2:
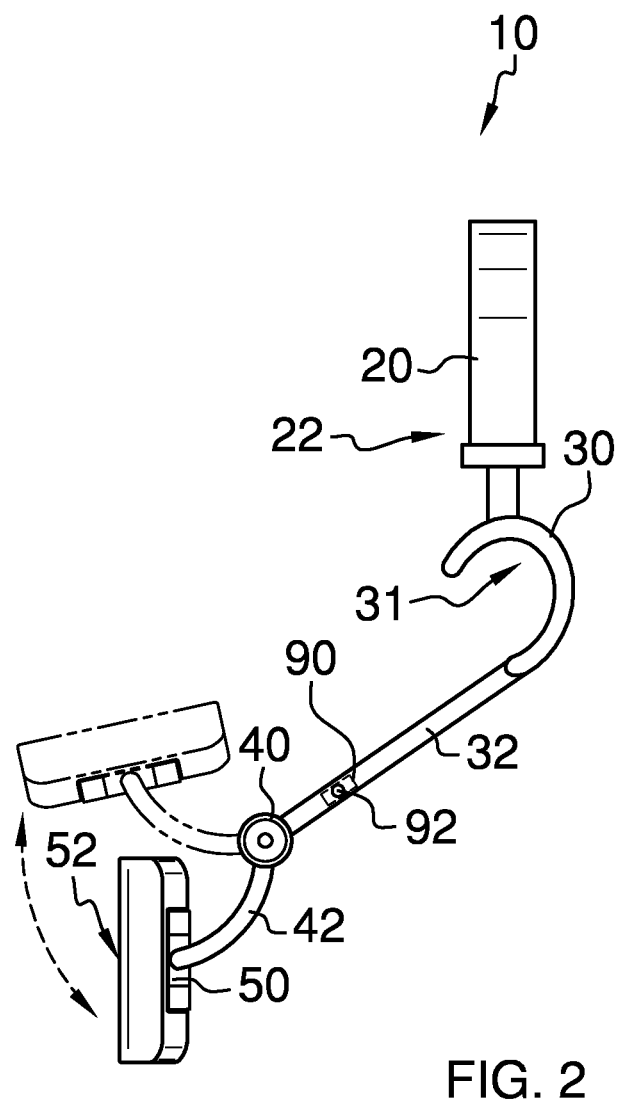
FIG. 2 is a side view illustrating the movement of a swivel joint.

Referring to FIG. 2, the swivel joint 40 is affixed distally to the first extension 32. The swivel joint 40 provides for almost 360 degrees of swivel.

Referring to FIG. 4 and again to FIG. 1, an arced second extension 42 extends downwardly and forwardly from the swivel joint 40.

Referring again to FIG. 3 and FIG. 4, the spring mount 50 is affixed vertically to the second extension 42. The spring mount 50 provides a flexible attachment for the mouthpiece 52. The spring mount 50 further provides pivotal attachment to the mouthpiece 52 whereby the mouthpiece 52 may be pivoted away from a user's mouth.

Referring to FIG. 2 and FIG. 3, the swivel joint 40 allows a user to pivot the mouthpiece 52 upwardly and downwardly and even backwardly. The spring mount 50 allows a user to pivot the mouthpiece 52 toward and away from a user's mouth.

Referring again to FIG. 1, the mouthpiece 52 has a base 53 spaced apart from a distal end 55. The base 53 is affixed vertically to the spring mount 50. An adjustment 51 is disposed upwardly in the spring mount 50.

Referring to FIG. 3, the mouthpiece 52 may be positioned to be in front of a user's mouth, and the adjustment 51 is then tightened such that any movement of the mouthpiece 52 sees the mouthpiece 52 automatically return to a position in front of the user's mouth. The adjustment 51 may be relaxed so that the mouthpiece 52 may be positioned as chosen.

The mouthpiece 52 includes a perforated plate 54 arcuately disposed between the base 53 and the distal end 55. A border 56 is disposed perimetrically around the interior surface of the plate 54 except at the distal end 55. The border 56 includes a plurality of crenellate members 57 disposed perpendicularly therefrom.

Figure 6:
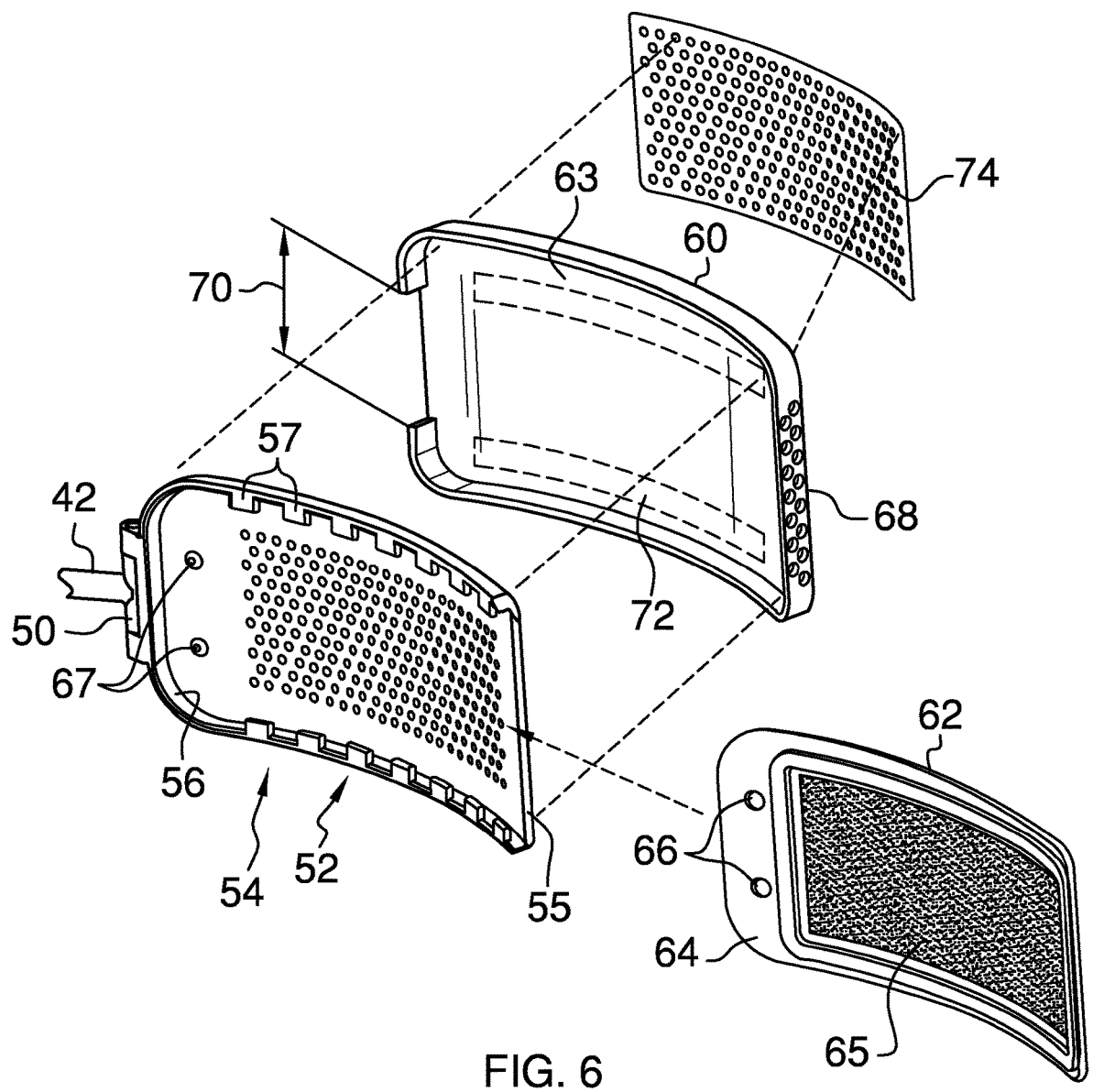
FIG. 6 is an exploded view of a mouthpiece, a filter, a mouthpiece cover, and a covering.

Referring to FIG. 6, a filter 62 is removably attachable to the mouthpiece 52. A plurality of interchangeable, disposable, and alternately, washable filters 62 is provided. Each filter 62 includes an arcuate member 64 with a filter piece 65 disposed therein. The arcuate member 64 is configured to releasably attach to the mouthpiece 52 to hold the filter piece 65 in proximity to, and overlying, the perforated plate 54. In the preferred embodiment herein disclosed, the filter 62 releasably fastens to the mouthpiece 52 by slidingly inserting into the mouthpiece 52 between each of the plurality of crenellate members 57 disposed to hold the filter against the mouthpiece 52 when the filter 62 is slid into the mouthpiece 52. A pair of holes 66 releasably clips into a pair of snaps 67 disposed in the mouthpiece 52 to releasably secure the filter 62 in position within the mouthpiece 52.

The filter piece 65 is bactericidal and fungicidal, and may also be scented to treat exhalations from the wearer before said exhalations contact another person, object, foodstuff, or relevant surface in a workspace whereby germs, pathogens, and bad odors are treated with each breath.

A mouthpiece cover 60 having a front surface 61 and a rear surface 63 is configured to releasably attach to the mouthpiece 52 and enclose the filter 62 when installed therebetween. The mouthpiece cover 60 is arcuate to conform and overlie the mouthpiece 52 and includes a plurality of perforations disposed on an outermost edge 68. A gap 70 is disposed on the opposite edge to accommodate the spring mount 50 attaching the mouthpiece 52 to the second extension.

The front surface 61 of the mouthpiece cover 60 may include a pocket 59 that is configured to allow a user to store at least one pill. At least one adhesive strip 72 may be disposed on the front surface 61 of the mouthpiece cover 60. An interchangeable, disposable, and alternately, washable perforated covering 74 may be removably attached to the at least one adhesive strip 72. The covering is bactericidal and fungicidal. The front surface 61 of the mouthpiece cover 60 may include an advertisement, brand name, or logo disposed on the exterior surface whereby said advertisement, brand name, or logo is visible to a person facing a user of the device 10. The device may also include a wireless interface 90 and a Wi-Fi activation control 92. The Wi-Fi activation control 92 is configured to turn on and alternately to turn off the device's wireless interface 90.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the adjustable mouth shield device may be used.

What is claimed is:

1. An adjustable mouth covering device;
   wherein the adjustable mouth covering device has a communication device for establishing a connection with a telephone, the adjustable mouth covering device having a mouthpiece having a cup shape with a continuous mouth covering surface, the mouth covering surface configured to face the mouth of a user when worn to confine spreading of germs and shield breath of the user; and
   wherein the mouth covering device is bactericidal and fungicidal, the mouth covering device having a disposable and interchangeable component, wherein the mouth covering surface is a rectangular plate.

2. The adjustable mouth covering device of claim 1, further comprising a mouthpiece filter slidably inserted between a plurality of members on the mouthpiece, the members configured to releasably attach the mouthpiece filter against the mouthpiece wherein the mouthpiece filter faces the mouth of the user.

3. The adjustable mouth covering device of claim 1 further comprising an adjustable headband having a first side spaced apart from a second side, the adjustable headband configured to be removably fitted atop a head of the user; an earpiece affixed downwardly to the adjustable headband second side; a first extension extended straight, forwardly and downwardly from the earpiece; and an arced second extension pivotally extended downwardly and forwardly from the first extension.

4. An adjustable mouth covering device;
   wherein the adjustable mouth covering device has a communication device for establishing a connection with a telephone, the adjustable mouth covering device having a mouthpiece having a cup shape with a continuous mouth covering surface, the mouth covering surface configured to face the mouth of a user when worn to confine spreading of germs and shield breath of the user; and
   further comprising a mouthpiece filter slidably inserted between a plurality of members on the mouthpiece, the members configured to releasably attach the mouthpiece filter against the mouthpiece wherein the mouthpiece filter faces the mouth of the user.

5. The adjustable mouth covering device of claim 4, further comprising an adjustable headband having a first side spaced apart from a second side, the adjustable headband configured to be removably fitted atop a head of the user; an earpiece affixed downwardly to the adjustable headband second side; a first extension extended straight, forwardly and downwardly from the earpiece; and an arced second extension pivotally extended downwardly and forwardly from the first extension.

* * * * *